United States Patent [19]

Shimada

[11] Patent Number: 4,655,728

[45] Date of Patent: Apr. 7, 1987

[54] FLEXIBLE COUPLING FOR ABSORBING AXIAL AND ROTATIONAL IMPACT

[75] Inventor: Kiyoshi Shimada, Yokosuka, Japan

[73] Assignee: Nissan Motor Co., Ltd., Yokohama, Japan

[21] Appl. No.: 725,541

[22] Filed: Apr. 22, 1985

[30] Foreign Application Priority Data

Apr. 23, 1984 [JP] Japan ................................. 59-81657

[51] Int. Cl.⁴ ............................................. F16D 3/80
[52] U.S. Cl. ........................................ 464/28; 464/180
[58] Field of Search ................... 464/24, 28, 74, 87, 464/89, 137, 138, 150, 180

[56] References Cited

U.S. PATENT DOCUMENTS

| | | | |
|---|---|---|---|
| 1,642,049 | 9/1927 | Waltz | 464/28 |
| 2,072,561 | 3/1937 | Kuhns et al. | 464/24 |
| 2,141,645 | 12/1938 | Fawick | 464/28 |
| 2,193,481 | 3/1940 | Fawick | 464/28 X |
| 2,929,231 | 3/1960 | Bank | 464/28 |
| 3,958,681 | 5/1976 | Sugahara et al. | 464/28 X |
| 4,067,207 | 1/1978 | Bohm et al. | 464/28 |
| 4,428,737 | 1/1984 | Schwenzfeier et al. | 464/28 |

FOREIGN PATENT DOCUMENTS

| | | | |
|---|---|---|---|
| 23246 | 2/1981 | European Pat. Off. | 464/28 |
| 1021213 | 12/1957 | Fed. Rep. of Germany | 464/89 |

Primary Examiner—Daniel P. Stodola
Attorney, Agent, or Firm—Schwartz, Jeffery, Schwaab, Mack, Blumenthal & Evans

[57] ABSTRACT

A flexible coupling having vibration damping function against vibration in the direction of rotation. The coupling comprises an elastic body connecting inner and outer tube, drive and driven shafts attached to the inner and outer tube, a fluid chamber partitioned into two sections adjacent to each other in the rotational direction by a protrusion which diametrically extends so that a narrow communication channel remains.

9 Claims, 8 Drawing Figures

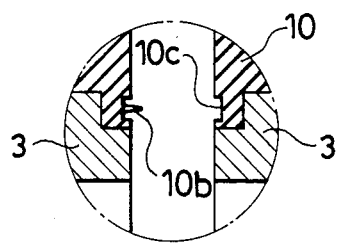
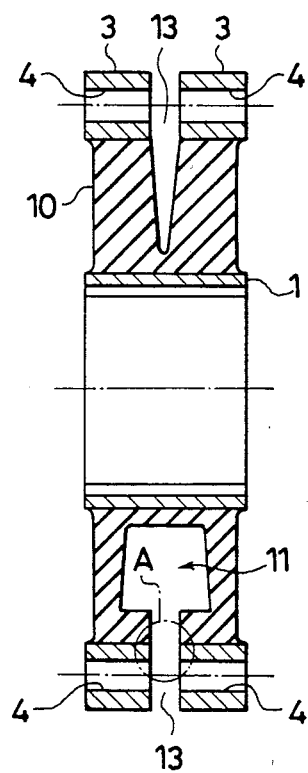
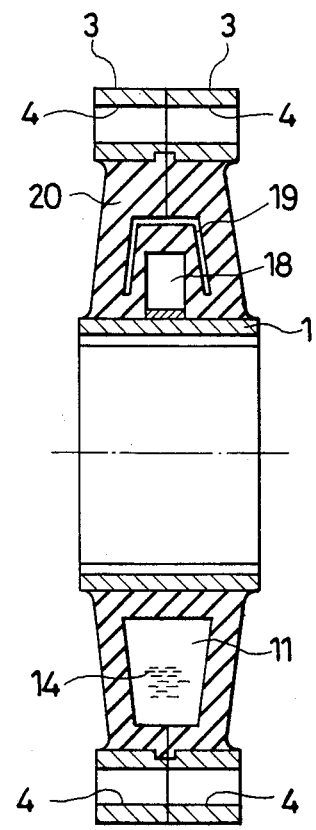

1

FLEXIBLE COUPLING FOR ABSORBING AXIAL AND ROTATIONAL IMPACT

BACKGROUND OF THE INVENTION

1. Field of the Invention

The present invention relates to a flexible coupling for a rotary drive transmission used on an automobile propeller shaft and the like.

2. Description of the Present Art

A commonly known conventional flexible coupling is a coupling which has an elastic body by which an inner tube and an outer tube are connected in the diametrical direction, and through this flexible body a rotary drive force is transmitted with pliant elastic distortion in the direction of the shaft and some degree of elastic distortion in the direction of rotation.

An example of such a conventional flexible coupling is the coupling illustrated on page 4 of "KE COUPLING" published in June 1983 by Kawasaki Heavy Industries, Ltd.

However, in such a conventional flexible coupling, if even a certain degree of elastic distortion is possible in the direction of rotation, since there is no damping effect there is a large resonance created in the rear suspension system, giving rise to the problem that the comfort in the vehicle is worsened.

For example, in a six cylinder automobile, when the engine is rotating at 3000 RPM, about 150 Hz of vibration is transmitted through the propeller shaft to the rear suspension, and if this frequency becomes the same as the resonant frequency of the rear suspension system, the rear axle vibrates severely in the front and rear direction of the vehicle from the resonance phenomenon.

This front to rear vibration, passing through the differential gear, becomes a vibration in the direction of rotation, and is transmitted to the propeller shaft. In a conventional flexible coupling this vibration cannot be damped, so that the sound vibration performance of the vehicle is worsened.

SUMMARY OF THE INVENTION

An object of the present invention is to provide a flexible coupling in which vibration due to torque variation is effectively reduced.

Another object of the present invention is to provide a flexible coupling which is capable of exhibiting pliant distortion in the direction of the shaft but has damping capability in the direction of rotation.

Briefly described, these and other objects of the present invention are accomplished by the provision of a flexible coupling which is provided with an elastic body connecting inner and outer tube, drive and driven shafts attached to the inner and outer tubes, a fluid chamber partitioned into two sections adjacent to each other in the rotational direction by protrusion which diametrically extends so that a narrow communication channel remains to allow limited fluid flow between the sections.

Accordingly, in such a flexible coupling, if, as outlined above, a load which alters both the inner tube and the outer tube in the direction of rotation is added and the flexible body is distorted, the capacity of one of the first and second fluid chambers is increased, while the other is decreased. Because the configuration of the narrow communication channel which connects these first and second fluid chambers is such that the contained fluid flows through it, opposed to the vibration added to the flexible coupling in the direction of rotation, it is possible to damp this vibration by means of the flow resistance of the contained fluid.

In addition, in conventional flexible couplings, damping capacity results from the volume of the elastic body. Contrary to this in the present invention pliancy is produced from the fluid chambers, thereby the flexible coupling can have a small, compact elastic body. Furthermore, it exhibits control of vibration in the direction of rotation, unlike conventional units.

BRIEF DESCRIPTION OF THE DRAWINGS

These and other objects, features and advantages of the present invention will become more apparent from the following description of a preferred embodiment taken in conjunction with the accompanying drawings, in which:

FIG. 3 is a sectional drawing of the flexible coupling viewed along the line II—II in FIG. 2.

FIG. 4 is an expanded drawing of Section A in FIG. 3.

FIG. 6 is a sectional drawing showing a second embodiment of the present invention.

DESCRIPTION OF THE PREFERRED EMBODIMENTS

Figure 1:
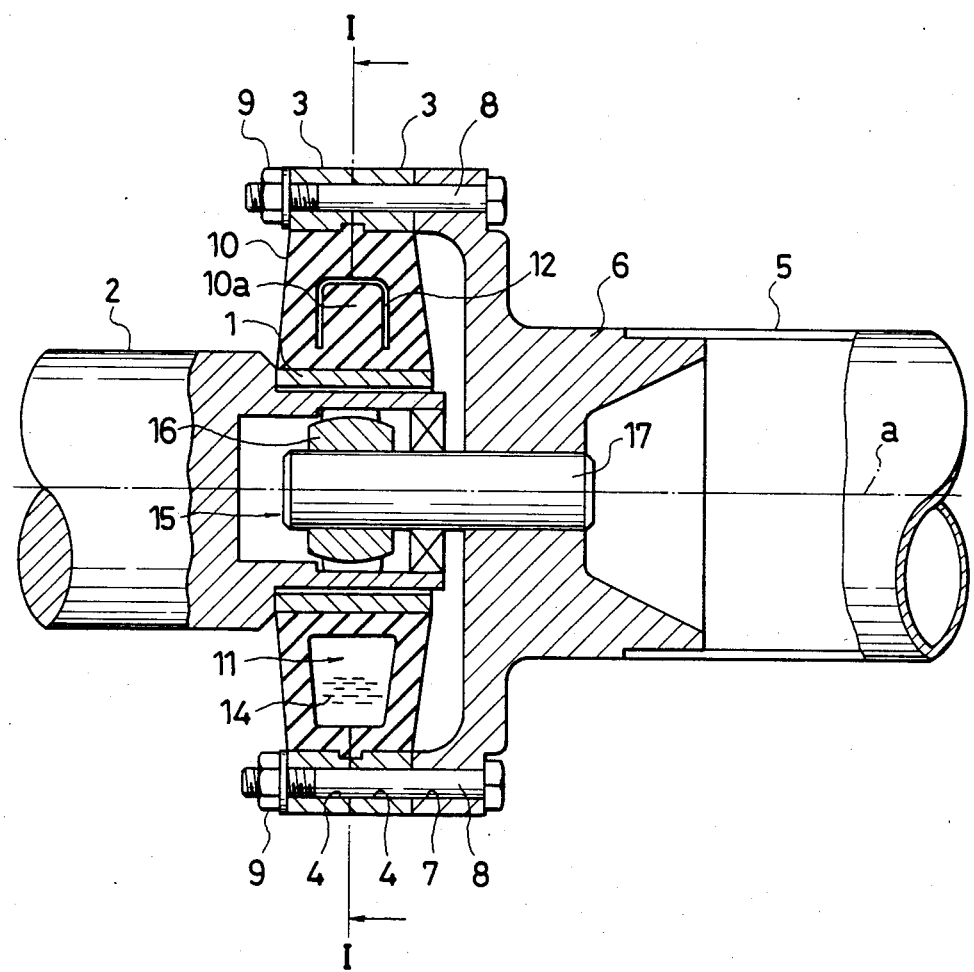
FIG. 1 is a sectional drawing showing a first embodiment of flexible coupling of the present invention in the mounted status.

Following is a description of the preferred embodiment of the present invention, with reference to the drawings. flexible couplings which are provided on the propeller shafts of the vehicle are described as examples.

First the configuration of the first embodiment of the present invention will be explained, as shown in FIG. 1 to FIG. 4.

An inner tube 1 is provided which has a spline groove cut into its inner surface. A drive shaft 2 is formed to be coupled with the inner tube 1 by means of a spline.

An outer tube 3 as shown in FIG. 3 is divided into two parts in the axial direction of the shaft 2 to form a plurality of outer tubes 3, 3. A plurality of bolt holes 4, 4 are formed as through holes in the outer tubes 3, 3, in the direction of the shaft.

A driven shaft 5 is provided with a flange 6 in which a bolt hole 7 is formed as a through hole to coincide with the bolt holes 4, 4. A bolt 8 is inserted through the bolt hole 7 and the bolt holes 4, 4 and is secured by a nut 9.

An elastic body 10 is connected to the outer surface of the inner tube 1 and the inner surface of the outer tube 3 in respect to the diametrical direction. The elastic body 10, the inner tube 1 and the outer tube 3 are joined together by heat treatment.

A fluid chamber 11 is formed in three locations evenly spaced around the inner circumference of the elastic body 10. This fluid chamber 11 incorporates a first fluid chamber 11a and a second fluid chamber 11b, divided by means of a plurality of projecting sections 10a, which extend from the inner tube 1 to the outer tube 3 in the diametrical direction.

Figure 2:
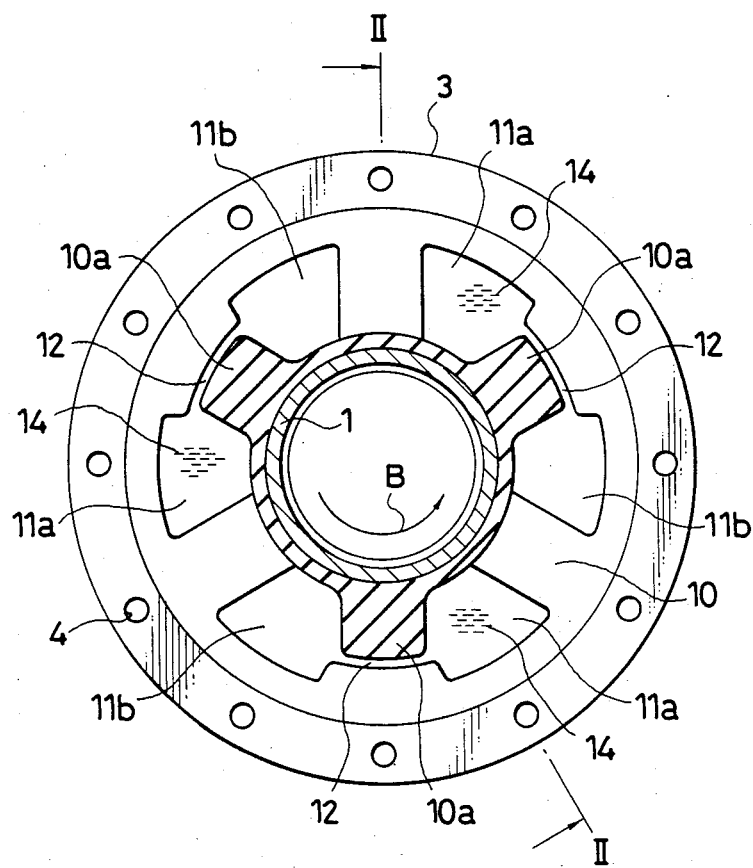
FIG. 2 is a sectional drawing of the flexible coupling viewed along the line I—I in FIG. 1.

A narrow communication channel 12 communicates between the first fluid chamber 11a and the second fluid chamber 11b, as shown in FIG. 2. In this embodiment of the present invention the narrow communication channel 12 is formed by the projecting sections 10a.

The first fluid chamber 11a and the second fluid chamber 11b, and the narrow communication channel 12, formed within the inner section of the elastic body 10, are divided by a V-shaped gap 13 prior to assembling as shown in FIG. 3, and when immersed in a contained liquid 14 and assembled with the bolt 8 and nut 9, the divided external tubes 3, 3 come together so that the gap 13 disappears, and the sealed fluid chambers 11a and 11b, and the narrow communication channel 12, which enclose the fluid 14, are formed.

In addition, the enclosed fluid 14 does not leak out, and as a result of being assembled, a sealing projection 10b is formed one of opposite surfaces on the outer diameter section of the elastic body 10, as shown in FIG. 4, and a sealing groove 10c is formed on the other opposite surface.

A centering device 15 is provided as shown in FIG. 1, comprising a bearing 16, provided on the drive shaft side, and a short shaft 17 on the driven shaft 5. This short shaft 17 projects into the inner surface of the bearing 16. This centering device 15 is provided so that the centerlines of the drive shaft 2 and the driven shaft 5 can be made to coincide.

Next, the use of the present invention will be explained.

When a force is applied in the axial direction of the shaft from the drive shaft 2 or the driven shaft 5, there is a comparatively lower spring constant, and the force in the axial direction can be neutralized with a large elastic distortion of the elastic body 10, because the fluid chamber 11 is formed in the internal section of the elastic body 10.

Also, the case where rotational drive force is added from the drive shaft 2 will be explained.

For example, when a rotational drive force is added in the direction of the arrow B in FIG. 2, the part of the elastic body adjacent to the inner tube 1 is distorted relative to the part of the elastic body adjacent to the outer tube 3 in the direction of the arrow B, and the projecting sections 10a move from the neutral positions shown in the drawings in the direction of the arrow B.

The capacity of the first fluid chamber 11a is reduced by the movement of these projection sections 10a, and the capacity of the second fluid chamber 11b is increased.

As a result of these changes in capacity, the contained fluid 14 in the first fluid chamber 11a passes through the narrow communication channel 12 and flows into the second fluid chamber 11b. By reason of the flow resistance of the narrow communication channel at the time this passage is taking place, the fluctuation in torque in the direction of rotation can be absorbed.

In this way, the fluctuation in torque from the drive system can be absorbed, and in addition there occurs no large resonance in the suspension system. Even if there is vibration from the driven shaft 5, damping is possible, and the vibration of the vehicle and noise resulting from that vibration are considerably improved.

The damping characteristics of this embodiment of the flexible coupling of the present invention form one resonance system according to the mass of the contained fluid 14 passing through the narrow communication channel 12, the mass of the elastic body 10 vibrating from the flow of the enclosed fluid 14, and the spring action of the entire elastic body 10.

Figure 5:
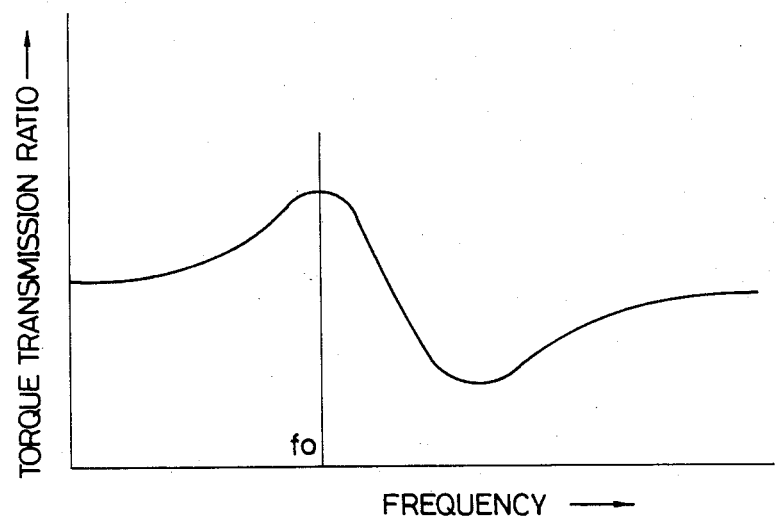
FIG. 5 is a characteristic drawing showing the relationship between the frequency and the torque transmission ratio in the flexible coupling of the first embodiment of the present invention.

For this reason, as shown in FIG. 5, at a certain specified frequency ($f_o$), the resonant status occurs, and the torque transmission ratio is reduced in the neighborring region of this frequency.

In the region in which this torque transmission ratio is reduced it is possible to even more effectively absorb and dampen the torque variation and vibration by tuning the resonant region of the suspension system and the frequency region in which noise is generated in the vehicle.

Accordingly, a flexible coupling such as this first embodiment becomes pliant in the shaft direction, and because a large damping action is produced against torque variation in the direction of rotation, the isolation of the vibration from the engine, and high vibration control result from the driven side suspension and the like, and the sound vibration capability of the vehicle is considerably improved.

Next the second embodiment of the present invention shown in FIG. 6 will be explained.

In this embodiment, a metal plate 18 is fixed to the inner section of the projecting section 19 and ensures the rigidity of this projecting section 19. The capacities of the first fluid chamber and the second fluid chamber cope with the torque variation and vibration in the direction of rotation.

The metal plate 18 of this embodiment is bent in an L-shape and spot-welded to the inner tube 1.

The balance of the construction and the action of this embodiment are the same as for the first embodiment. The same numbers are applied for like members in the drawings. Explanation will be omitted.

Figure 7:
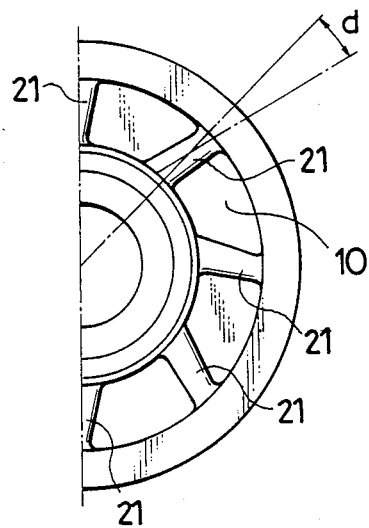
FIG. 7 is a partial front view of an embodiment of flexible coupling of the present invention.
Figure 8:
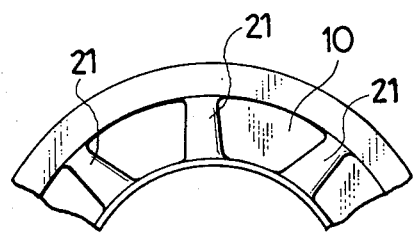
FIG. 8 is a partial view showing ribs on flexible coupling subjected to rotation.

As shown in FIG. 7, on the axial face surface of the resilient body 10 or 20 a plurality of ribs 21 which are formed by partially thickening the flexible body may also be provided. In this case, it is desirable for the ribs to have a previously-formed slant with angular difference d from radial direction, so that when no torque is being transmitted, the ribs appear as shown FIG. 7, but when a normal torque is being transmitted for example, when rotation is being produced in the forward direction, the ribs are orientated in the radial direction as shown in FIG. 8.

It is intended that all matter contained in the foregoing description and in the drawings shall be interpreted as illustrative only, and not as limitative of the invention.

For example, in the embodiments of the present invention, flexible couplings suitable for use on an automobile propeller shaft were illustrated. However, the present invention may be used for connecting any suitable drive shaft and driven shaft, in addition to a propeller shaft.

In addition, while the number of fluid chambers is limited to three in this embodiment, any number of fluid chambers appropriate to the size of the flexible coupling and other suitable conditions may be used.

Also, the projecting sections were illustrated as pointing from the inside to the outside, but it would also be acceptable to have them point from the outside to the inside.

What is claimed is:

1. A flexible coupling comprising:

an outer tube;

an inner tube located within said outer tube;

a substantially cylindrically shaped elastic body connecting said inner tube and said outer tube in the diametrical direction, said outer tube, inner tube and elastic body having a common central axis;

a drive shaft attached to one of said inner and outer tubes;

a driven shaft attached to the other of said inner and outer tubes, said drive and driven shafts being movable relative to each other in an axial direction due to the elasticity of said elastic body;

a sealed fluid chamber formed circumferentially within said elastic body; and means for dividing said fluid chamber into first and second circumferentially-extending sections connected by a narrow communication channel and for causing a fluid contained in said first and second sections to flow circumferentially from one to the other through the narrow channel in response to relative rotational movement of said inner and outer tubes, said dividing and flow causing means comprising a protruding member provided in said fluid chamber, said protruding member being integrally attached at a base end to said elastic body on one side of said fluid chamber and being free at its distal end such as to be movable about the central axis in response to relative rotation of said inner and outer tubes and due to resiliency of the elastic body, said protruding member extending radially through said fluid chamber and terminating at its distal end near the opposite side of said fluid chamber to divide the fluid chamber into said first and second sections and to form said narrow communication channel.

2. A flexible coupling of claim 1, wherein said elasitc body comprises a radially extending seam, whereby said fluid chamber can be changed from an open condition prior to attaching said inner and outer tubes to the shafts to a sealed condition.

3. A flexible coupling of claim 2, wherein a substantially V-shaped gap is disposed in the circumferential portion of said elastic body constituting an annular wall of the fluid chamber as well as the tube attached thereto, said gap being adapted to be sealed when the tube is secured to the shaft.

4. A flexible coupling of claim 3, wherein said tube is formed with bolt holes and secured to the shaft by bolts and nuts disposed in said bolt holes.

5. A flexible coupling of claim 4, wherein said fluid chamber is completely sealed by a groove and a projection which are formed on the opposite surfaces of the two parts of the elastic body.

6. A flexible coupling of claim 1 further comprising a plurality of fluid chambers.

7. A flexible coupling of claim 1, wherein said protruding member is reinforced by a metal plate embedded therein.

8. A flexible coupling of claim 1, wherein a plurality of radially extending ribs are formed on an outer end surface of the elastic body.

9. A flexible coupling of claim 8, wherein said ribs are slanted so as to align in a radial direction during rotation of the coupling.

* * * * *